United States Patent [19]
Kessler

[11] Patent Number: 6,079,792
[45] Date of Patent: Jun. 27, 2000

[54] TRAILER BRAKING SYSTEM

[75] Inventor: David D. Kessler, 14025 Pritchard Rd., Springville, N.Y. 14141

[73] Assignee: David D. Kessler, Springville, N.Y.

[21] Appl. No.: 09/009,010

[22] Filed: Jan. 16, 1998

[51] Int. Cl.$^7$ .................................................. B60T 13/00
[52] U.S. Cl. ........................................... 303/7; 188/112 A
[58] Field of Search ............................ 303/7; 188/112 R, 188/112 A

[56] References Cited

U.S. PATENT DOCUMENTS

| | | |
|---|---|---|
| 1,909,403 | 5/1933 | Hinman . |
| 2,354,687 | 8/1944 | Keith et al. . |
| 3,570,633 | 3/1971 | Garnett . |
| 3,768,606 | 10/1973 | Mizen et al. ........................ 188/112 R |
| 3,790,807 | 2/1974 | Rossigno . |
| 4,077,487 | 3/1978 | Misinchuk . |
| 4,174,869 | 11/1979 | Hipps . |
| 4,395,883 | 8/1983 | Melinat . |
| 4,576,417 | 3/1986 | Dobner . |

FOREIGN PATENT DOCUMENTS

1646-928  5/1991  U.S.S.R. ............................ 188/112 R

Primary Examiner—Matthew C. Graham
Attorney, Agent, or Firm—Harris Beach & Wilcox, LLP

[57] ABSTRACT

A trailer braking system including one or more trailer wheel assemblies having conventional hydraulically-actuated shoe or disc brakes; a conventional brake master cylinder mounted on the trailer to provide pressurized hydraulic fluid to the wheel cylinders to actuate the brakes; an electric solenoid mounted on the trailer to drive the piston of the master cylinder, preferably through a force-multiplying lever arm, in response to an electrical braking signal from the towing vehicle; and a controller to generate a braking signal proportional to the amount of braking force desired in the trailer brake. The controller may be connected to, and follow the movement of, an element of the towing vehicle's braking system, such as the brake pedal or the vehicle master cylinder piston rod, or the controller may be manually actuated by an operator. There is a manual parking brake which can maintain the force exerted on the wheel cylinder by the trailer master cylinder when power to the solenoid is shut off. The trailer brake is simple to assemble from readily available components, is inexpensive to provide to a new or existing trailer, and is reliable under adverse conditions of use. Since the trailer-mounted elements have no open electrical contacts, as would be required in a motor actuator, the present brake is especially suited for uses requiring occasional immersion of the wheel assemblies or even the entire trailer, such as on boat trailers.

13 Claims, 6 Drawing Sheets

TRAILER BRAKING SYSTEM

BACKGROUND OF THE INVENTION

1. Field of the Invention

The present invention relates to braking apparatus for arresting the rotation of vehicle wheels, more particularly to braking apparatus for towed vehicles such as trailers, and most particularly to an electromechanical hydraulic trailer braking system wherein the entire system may be immersed in water without electrical failure and loss of function.

2. Discussion of the Related Art

As used herein, a "trailer" is a non-powered wheeled vehicle intended to be towed by a powered, or towing, vehicle. A trailer, therefore, is a slave to the vehicle to which it is attached, and that vehicle is responsible for both acceleration and deceleration of the trailer. For light-duty trailers, the mechanical rigidity of the trailer hitch in the direction of travel generally can provide adequate braking control of the trailer via the brakes of the towing vehicle. However, for larger, medium- or heavy-duty trailers whose loaded weight may approach or exceed the weight of the towing vehicle, it is desirable to provide a braking system for the trailer itself, which system should be responsive to signals from the towing vehicle. Even for light-duty trailers in some applications, it can be desirable to provide brakes, especially via retro fit, which are effective, relatively inexpensive, and simple to install.

Mechanically-actuated vehicle brakes are well known. Typically, a lever within the vehicle wheel assembly and connected to a foot pedal or a handle actuates a pair of pivotable brake shoes outward to sliding engagement with a rotating drum to which the vehicle wheel and tire are attached. Progressively increasing force on the lever provides progressively increasing braking action of the shoes against the drum. This basic arrangement of components was typical for mechanical brakes for most trucks and automobiles before the industry-wide conversion to hydraulic brakes around 1940. It is still used as a mechanical parking brake on some vehicles to this day.

Electric trailer brakes typically are electrically-actuated versions of mechanical brakes. In simplest form, an electromagnet is connected to the shoe-actuating lever and is movably mounted on the stationary backer plate of the wheel assembly. Energizing the electromagnet causes it to be attracted to the inner surface of the steel brake drum. Such attraction causes the lever to be moved and thus induces braking action by the shoes.

A serious shortcoming of known electrically-actuated brakes is the vulnerability of the electromagnet to wear or damage whereby the magnet can be electrically shorted, causing the brakes to become inoperative. It is known for the electromagnet to become worn from rubbing contact with the drum, and for the insulation on the electric wire turnings in the magnet to be thus abraded, allowing a short circuit to develop in the magnet. Being located in the wheel assembly, the electromagnet is exposed to road moisture and contaminants, and especially to water, as when the trailer is used to launch or retrieve a boat at an inclined launching ramp.

Another serious shortcoming is the relatively poor braking power generated by the electromagnet operating on the lever, since the size of the electromagnet is limited by the space within the brake drum. Typically, such a braking system is only marginally effective in assisting the towing vehicle in stopping a trailer. Further, it has no braking action when power to the electromagnet is turned off; thus it cannot be used as a parking brake when the trailer is unhitched from the towing vehicle.

Improved brakes wherein the wheel-mounted electromagnet is obviated have been proposed. Typically, one or more hydraulic cylinders replaces the actuating mechanism of a mechanical brake. The wheel cylinder is responsive to changes in pressure in a hydraulic feed line from a master cylinder remote from the wheel either to drive pivotable brake shoes outwards against the brake drum or to urge caliper-mounted pads into contact with a wheel-mounted disc.

In applying this technology to a trailer which typically is connectable to a hauling vehicle via a temporary ball-and-socket hitch, it is desirable that the hydraulic elements be self-contained on the trailer and that only an electric cable capable of carrying signals from the towing vehicle be connected or disconnected at the hitch. Such a trailer braking system, therefore, requires electromechanical means on board the trailer for converting electrical impulses from the towing vehicle into hydraulic action of the brakes. Various such mechanisms have been proposed.

In some trailer braking systems, slight relative motion at the hitch between the towing vehicle and the trailer provides the hydraulic pressure to apply the brakes of a towed vehicle when the towed vehicle moves forward (surges) relative to the towing vehicle when the brakes of the latter are applied, as disclosed for example in U.S. Pat. No. 3,768,606 issued Oct. 30, 1973 to Mizen et al. Since a trailer brake responsive to relative motion between the towed and towing vehicles must be capable of discriminating between real braking needs and ordinary surge in use, including backing and parking of the trailer, this system includes a complicated arrangement of springs and pivots as well as a mode-enabling solenoid.

Another system uses inertial forces on the trailer, responsive to velocity changes in the towing vehicle, to actuate a trailer's brakes. For example, U.S. Pat. No. 3,570,633 issued Mar. 16, 1971 to Garnett discloses a hydraulic brake actuator wherein a solenoid energized by the towing vehicle's brake light circuit opens a hydraulic valve in a hydraulic braking system onboard a trailer. Hydraulic pressure for braking is generated by inertial forces on the trailer acting through the hitch when the towing vehicle is braked. This system may provide little braking action at low vehicle velocities as, for example, during parking or in loading or unloading a trailered boat on a launching ramp.

It is known, for example, to provide an electric-powered hydraulic system on board the trailer. U.S. Pat. No. 4,174,869 issued Nov. 20, 1979 to Hipps discloses a trailer braking system wherein the hydraulic output of a hydraulic gear pump is passed to the wheel cylinders past a solenoid control valve whose position is set in response to the braking force applied to the brakes in the towing vehicle.

It is also known, for example, to provide a linear motor to actuate a hydraulic master cylinder in an auxiliary braking system, although not in a trailer braking system. See U.S. Pat. No. 4,077,487 issued Mar. 7, 1978 to Misinchuk.

In general, known embodiments of hydraulically-operable trailer brakes can be expensive to manufacture and costly to maintain because of the inclusion of many specially-made precision parts such as pumps, valves, switches, springs, levers, and sensors. In addition, known brakes can be uneven in braking action, and can be vulnerable to hazards such as dust, rain, and water.

Thus, there is a need for an electromechanical hydraulic trailer braking system which is simple to assemble from readily available components, is inexpensive to provide to a new or existing trailer, and is reliable under adverse conditions of use.

SUMMARY OF THE INVENTION

It is a principal object of the invention to provide an improved trailer braking system which is simple and inexpensive to assemble from standard components.

It is a further object of the invention to provide an improved hydraulic trailer braking system which is readily fittable to a trailer without brakes, or is readily retrofittable to a trailer having an existing inferior braking system.

It is a further object of the invention to provide an improved hydraulic trailer braking system which is readily adapted to provide independent braking of wheels on a plurality of trailer axles.

It is a still further object of the invention to provide an improved hydraulic trailer braking system which is reliable under generally adverse conditions of use.

It is a still further object of the invention to provide an improved hydraulic trailer braking system which can be used underwater without adverse effect on the system.

It is a still further object of the invention to provide an improved hydraulic trailer braking system wherein braking may be maintained when the trailer is parked and electric power is no longer supplied to the braking system.

Briefly described, a trailer braking system embodying the invention includes one or more trailer wheel assemblies having conventional hydraulically-actuated shoe or disc brakes. A conventional brake master cylinder, mounted on the trailer, provides pressurized hydraulic fluid to the wheel cylinders to actuate the brakes. An electric solenoid mounted on the trailer drives the piston of the master cylinder, preferably through a force-multiplying lever arm, in response to an electrical braking signal from the towing vehicle. The signal is generated by a controller and is proportional to the amount of braking force desired in the trailer brake. The controller may be connected to, and follow the movement of, an element of the towing vehicle's braking system, such as the brake pedal or the vehicle master cylinder piston rod, or the controller may be manually actuated by an operator. The system is provided with a manual parking brake which can mechanically immobilize the piston rod of the trailer master cylinder to maintain the force exerted on the wheel cylinders by the master cylinder when power to the solenoid is shut off.

Since the trailer-mounted elements have no open electrical contacts, as would be required, for example, in a motor-actuated brake, the present brake is especially suited for uses requiring occasional immersion, such as on small boat trailers.

BRIEF DESCRIPTION OF THE DRAWINGS

The foregoing and other objects, features, and advantages of the invention, as well as presently preferred embodiments thereof, will become more apparent from a reading of the following description in connection with the accompanying drawings in which.

DETAILED DESCRIPTION OF THE INVENTION

Figure 1:
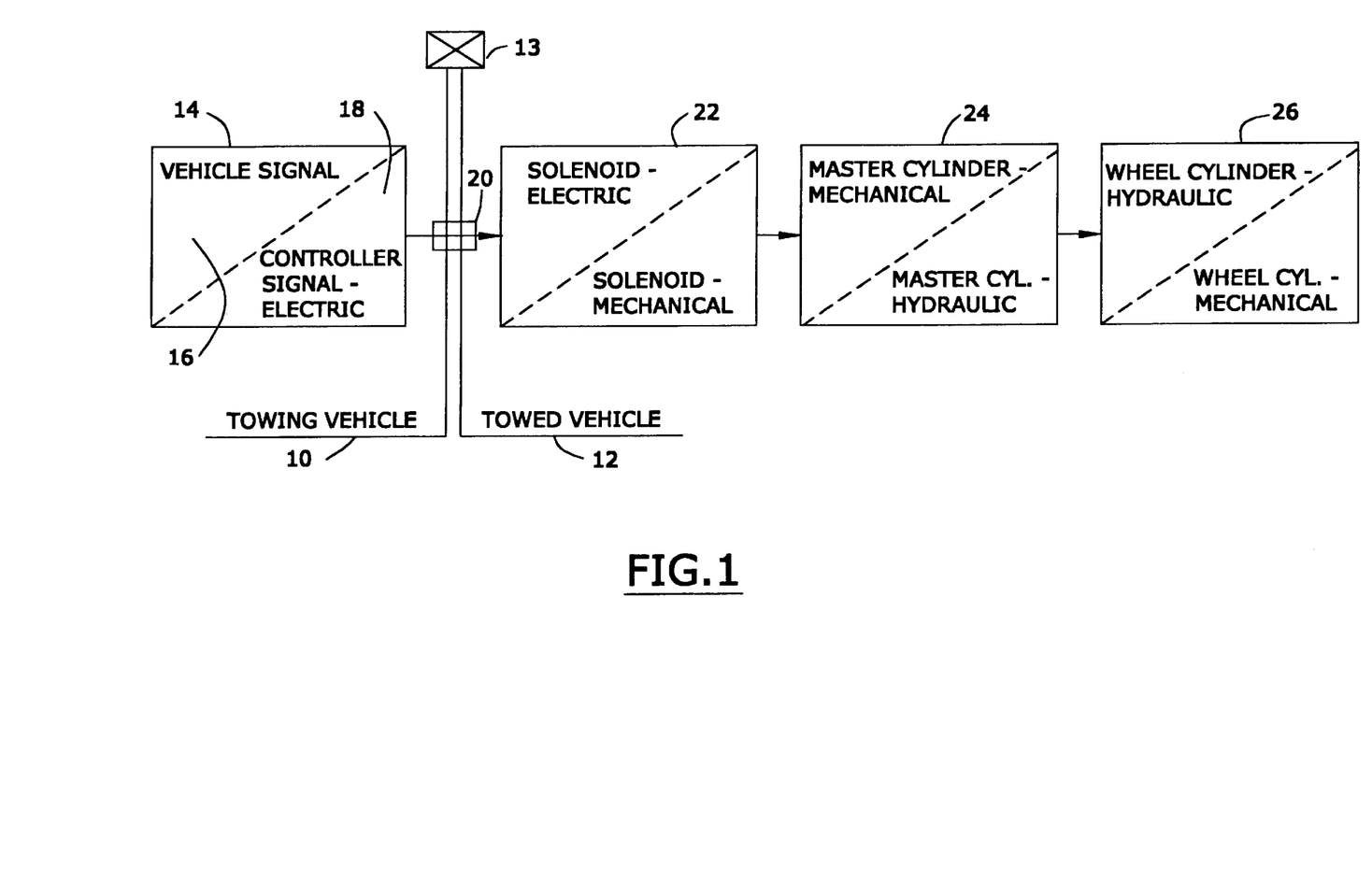
FIG. 1 is a schematic diagram showing the relationship of the main components of a braking system in accordance with the invention.

Referring first to the schematic diagram in FIG. 1, there is shown a powered wheeled vehicle 10 equipped to tow a second wheeled vehicle 12 such as a trailer via a known mechanical hitch 13 therebetween. Vehicle 10 is provided with an electrical control means 14 capable of receiving an input signal 16 generated by vehicle 10, signal 16 being indicative of a need to engage or to disengage braking means in vehicle 12. The controller input signal may be taken, for example, from the position or motion of vehicle 10's brake pedal or master cylinder piston rod. Preferably, the source of signal 16 is variable to indicate the degree of braking desired in the towed vehicle 12. Signal 16 may also be generated manually by the operator of vehicle 10.

Control means 14 may be any of various well-known electrical controllers or relays capable of receiving a variable electrical or mechanical input signal 16, preferably a 12 volt DC signal, and transmitting or relaying an amplified proportional electrical output signal 18, drawing power from a source such as a battery. A braking system in accordance with the invention may be adapted to use an output signal which varies in, for example, voltage amplitude, current amplitude, or frequency of current pulses. Preferably, control means 14 is an inexpensive, commercially-available variable-resistance voltage divider (also known as a slidewire or rheostat) which can provide a voltage-variable output signal.

Electric braking signal 18 is sent via a connector 20 at hitch 13 to a solenoid 22 on board trailer 12 which converts the signal to a mechanical stroke of the solenoid's armature. The armature is drivingly coupled to the piston rod of a master cylinder 24. The action of the piston converts the mechanical signal to a hydraulic pressure signal which is transmitted via a hydraulic line to the wheel cylinder 26 of a conventional drum braking or disc braking wheel assembly at the suspension undercarriage of trailer 12, to arrest or to free the rotation of the trailer's wheel. The hydraulic signal may be split, of course, in known fashion to provide identical braking of wheels on opposite sides of the trailer.

Figure 2:
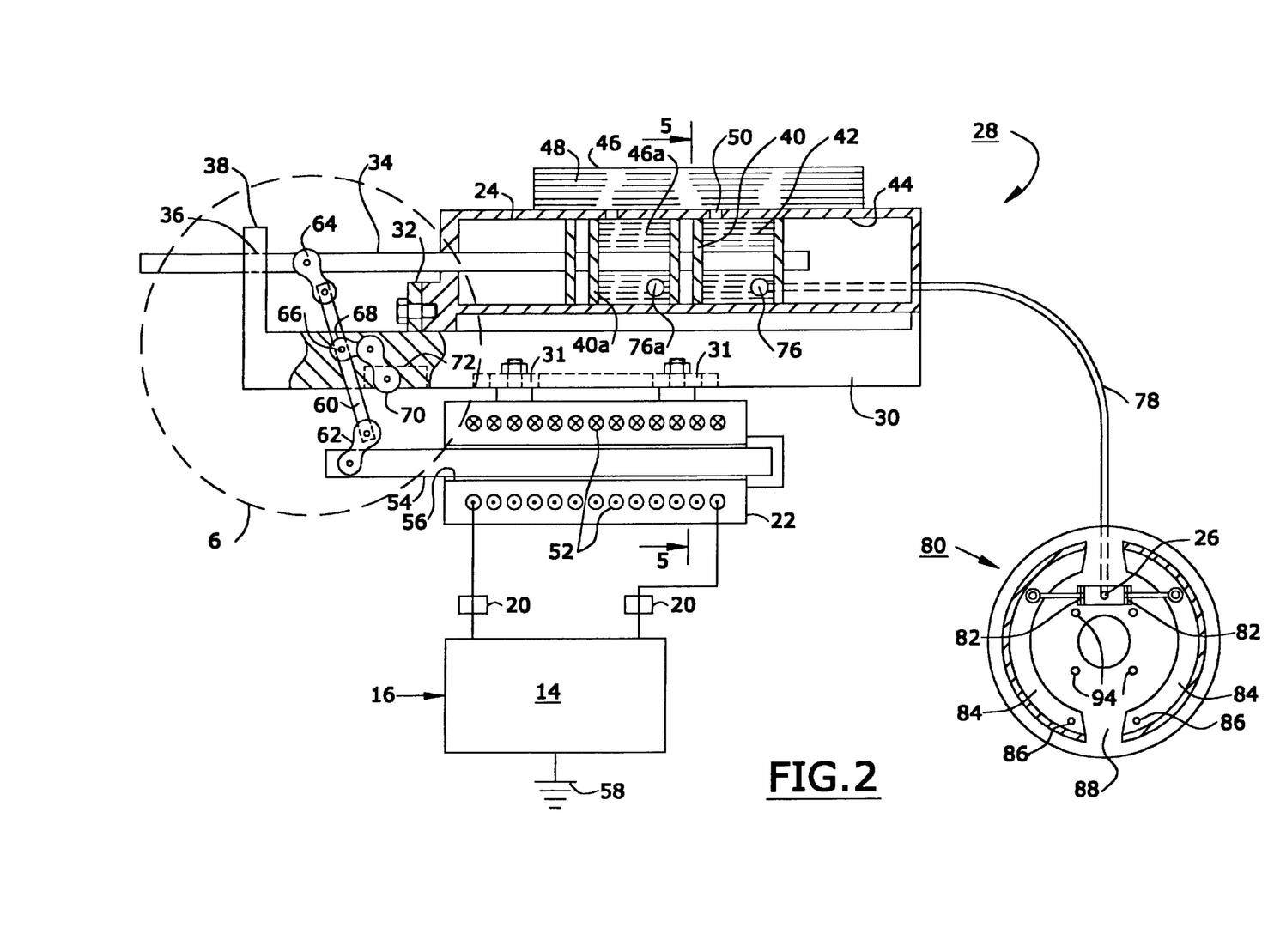
FIG. 2 is an elevational view, partially in cross section and partially schematic, of the braking system shown in FIG. 1.
Figure 5:
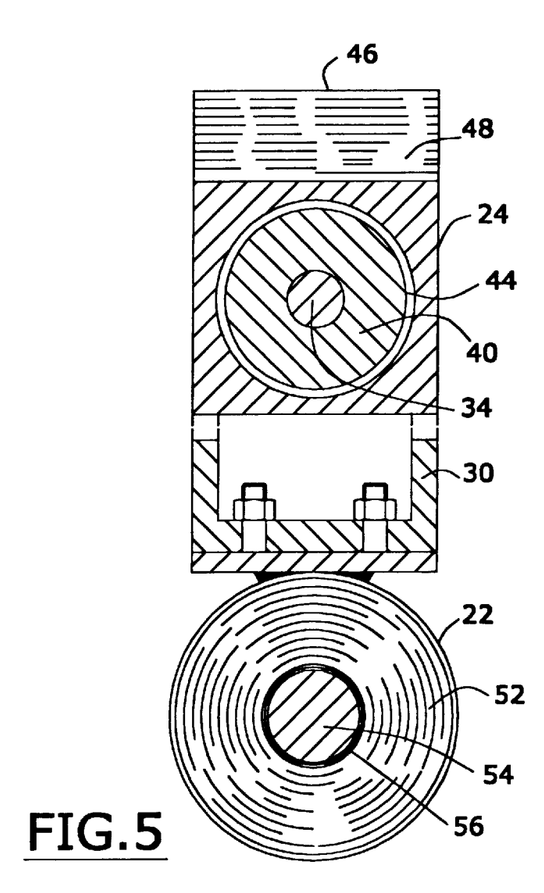
FIG. 5 is an elevational view in cross section taken along line 5—5 in FIG. 2.
Figure 6:
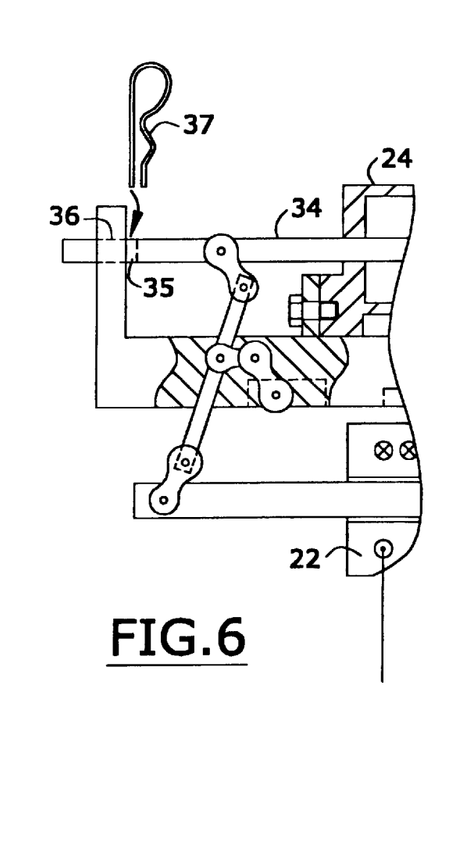
FIG. 6 is an elevational view partially in cross section taken in circle 6 in FIG. 2, showing the position of the actuating elements of the solenoid and master cylinder when the brakes are applied and the parking brake is lockable.

Referring now to FIGS. 2, 5, and 6, a first embodiment 28 of a braking system in accordance with the invention has a channel-shaped frame 30 which preferably is mountable on the frame of a trailer (not shown) at any convenient position between the hitch and the suspension. A conventional motor vehicle hydraulic brake master cylinder 24 is bolted onto frame 30 via a first flange 32. The piston rod 34 at one end extends through a guide bore 36 in a second flange 38 of frame 30 and near the other end is fixed to a piston 40 disposed to slide axially of a pressurizing chamber 42 in a bore 44 of cylinder 24. A reservoir 46 on top of the master cylinder contains hydraulic fluid 48 which is provided by gravity to chamber 42 via passageway 50.

Also mounted via bolts to frame 30 is electric solenoid 22, including helically-wound insulated wire windings 52 around a ferromagnetic armature or slug 54 slidably disposed in a bore 56 in solenoid 22. In embodiment 28, the actuating motion of the slug is parallel to, but opposite in direction from, the motion of piston rod 34, for reasons explained hereinbelow. Windings 52 are electrically connected across control means 14, which preferably is mounted in the towing vehicle and draws electric power from battery 58.

Figure 7:
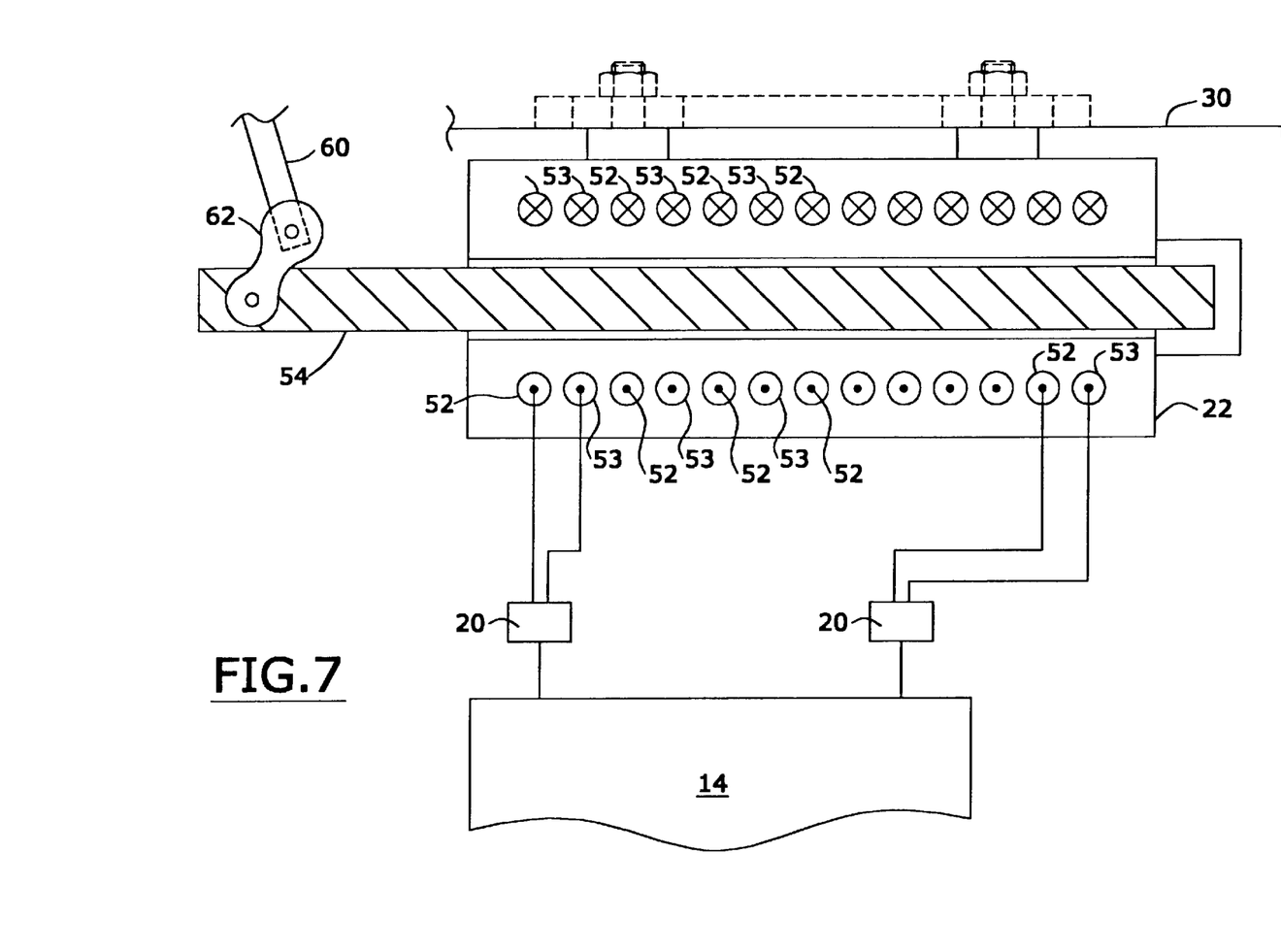
FIG. 7 is a cross-sectional view of a double-wound solenoid.

Solenoid 22 may be provided with double windings 53 independently suppliable with electric signals, as shown in FIG. 7, which can be a safety feature in that the solenoid will continue to provide braking albeit at a reduced level in the event that electric power is lost to either one of the windings as by, for example, a partial separation of the trailer connector.

Figure 3:
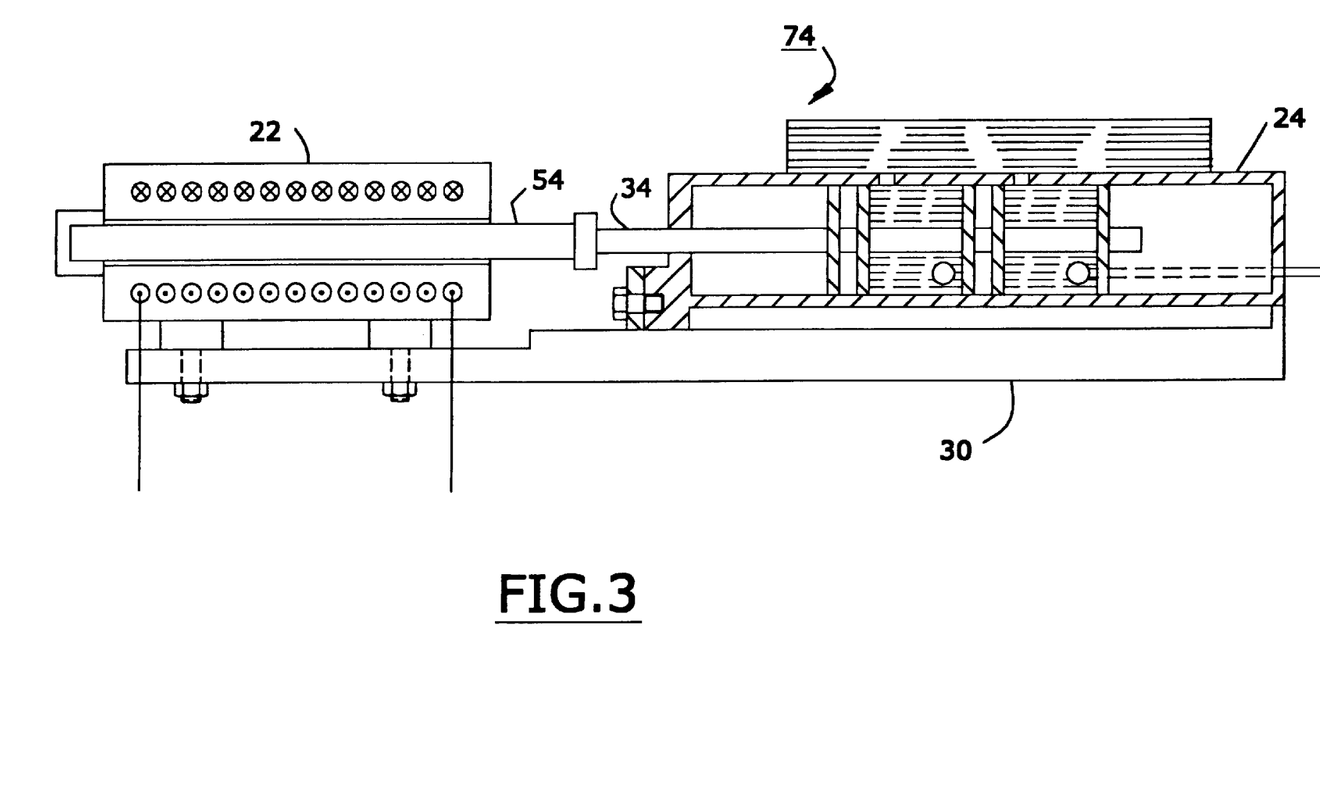
FIG. 3 is an elevational view, partially in cross section, showing another embodiment of a braking system in accordance with the invention.

Slug 54 is coupled to piston rod 34 via lever 60 and an arrangement of chain linkages which can adapt the arcuate pivoting of lever 60 to the linear translations of rod 34 and slug 54. Specifically, slug 54 is pivotably connected to lever 60 at one end thereof by a first flexible chain link 62, and to rod 34 by a second flexible chain link 64. A floating fulcrum 66, or pivot point, for lever 60 is provided by a connected pair of links 68,70 attached at one end to lever 60 and at the other end to a bracket 72 on frame 30. Preferably, links 68,70 are attached to lever 60 at a point substantially nearer to rod 34 than to slug 54. This arrangement multiplies or compounds the actuating force provided by solenoid 22 on master cylinder 24, and can permit the use of a relatively small solenoid for many braking applications. In a second embodiment 74, shown in FIG. 3, for example, a solenoid is directly and axially coupled to a master cylinder. Since no force multiplication is possible, a larger and more expensive solenoid may be required for such a configuration.

When the solenoid has been activated and force applied to the piston rod, the actuation portion of embodiment 28 typically assumes a configuration like that shown in FIG. 6. It is a feature of the invention that after actuation the piston rod may be locked in place to provide a mechanical parking brake requiring no electric power, as when a trailer is unhitched from a towing vehicle. Piston rod 34 may be locked in place by any of a wide range of known mechanisms, for example, by a threaded nut on a threaded portion of rod 34, or by placement of a pin through a hole in rod 34. Preferably, piston rod 34 is provided with at least one annular groove 35 so located on rod 34 that it passes just through guide bore 36 at the limit of travel of rod 34 during actuation, as shown in FIG. 6. A restraining means such as hitch pin 37 may be clipped into groove 35 thereby restraining rod 34 from retracting from master cylinder 24 and maintaining hydraulic pressure to the braking mechanism even when power to the solenoid is terminated.

Preferably, solenoid 22 is bolted to frame 30 through longitudinally-slotted holes 31 in frame 30. The force exertable by a solenoid varies with the degree of extension of the slug. The slotted holes permit the longitudinal position of the solenoid to be adjusted to provide a desired level of force for any particular application.

Figure 4:
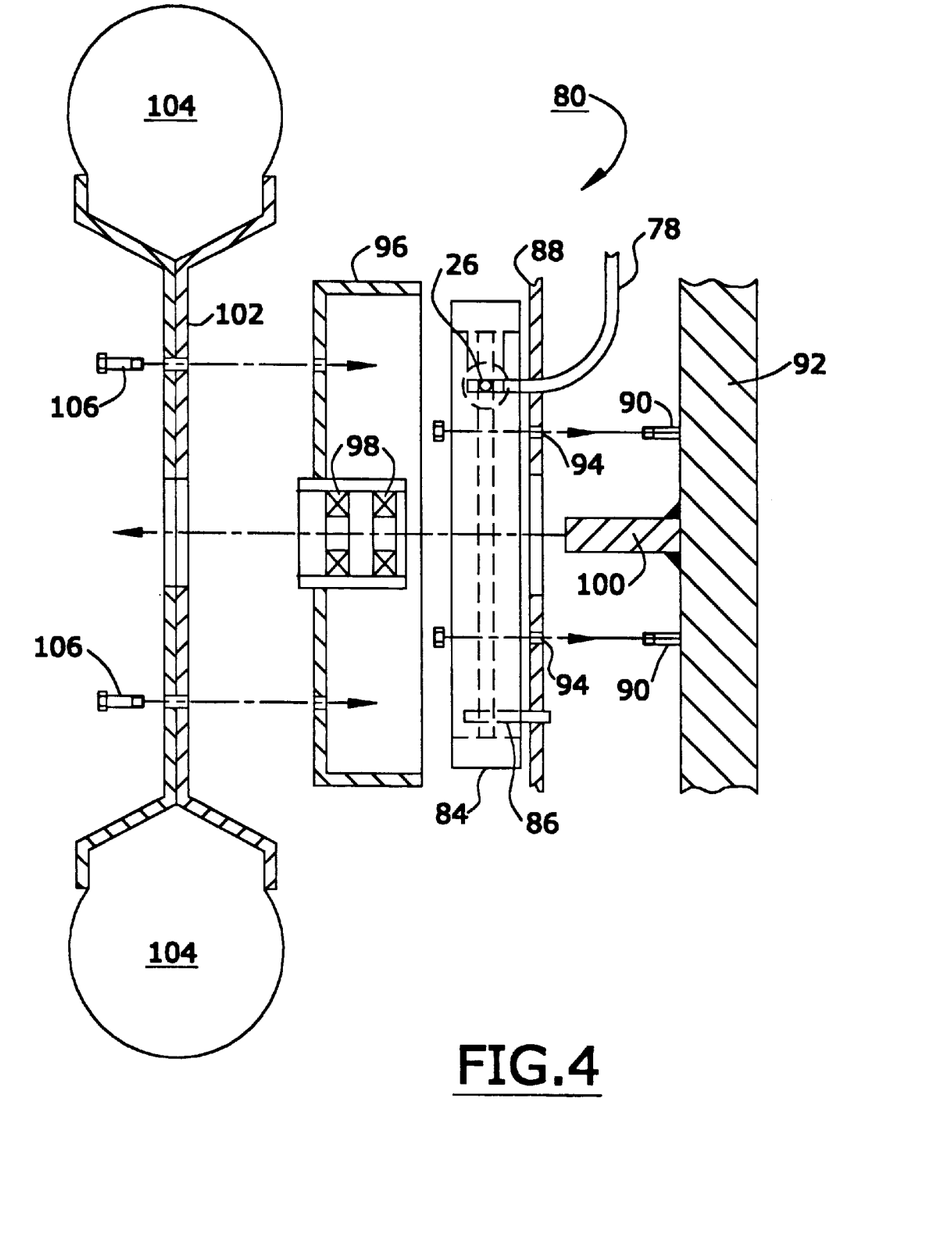
FIG. 4 is an exploded elevational view in cross section of a hydraulically-actuated drum brake wheel assembly.

Chamber 42 is provided with an outlet port 76 connected in known fashion via hydraulic tubing 78 to a wheel cylinder 26 of a conventional wheel braking assembly 80, shown only partially in FIG. 2 for simplicity. Wheel cylinder 26 is provided preferably with a pair of opposed pistons 82 which engage opposing brake shoes 84 which are pivotally mounted on studs 86 on backer plate 88. Plate 88 may be mounted directly on studs or bolts 90 of the suspension undercarriage 92 of a trailer via holes 94, as shown in FIG. 4, wherein a complete conventional wheel assembly 80 is shown. Brake drum 96 is provided with a pair of wheel bearings 98 fitted to a central aperture therein, the bearings being supported for running on stub shaft 100 affixed to undercarriage 92. Wheel 102 carries a pneumatic tire 104 and may be bolted to drum 96 by hub bolts 106. Wheel braking assembly 80 may incorporate disc brakes (not shown) instead of drum brakes within the scope of the invention.

If undercarriage 92 is not provided with a fixed stub shaft 100, the wheel assembly itself may be provided with a stub shaft attached directly to a solid backer plate (not shown) similar to plate 88. This capability can be particularly useful when retrofitting light-duty existing trailers having no braking system.

For added braking capacity where desired, as shown in FIG. 2, master cylinder 24 may be provided in known fashion with a second piston 40a on piston rod 34 in a second pressurizing chamber 42a having a second outlet port 76a hydraulically connectable to a second wheel assembly or pair of assemblies (not shown), for example, for a second axle of a tandem-axle trailer.

It is a feature of the invention that an entire braking system may be assembled from inexpensive, readily-available, conventional components. Thus, not only may new trailers be availed of the improved braking system, but older trailers having inferior or no braking systems may be easily and inexpensively retrofitted to enhance their safety and handling.

It is a further feature of the invention that the piston rod of the master cylinder is actuated by an electric device (a solenoid) having no open or sliding electrical contacts, such as are necessary for an electric motor. Therefore, all actuating elements of the invention are fully immersible without risk of electrical failure.

From the foregoing description it will be apparent that there has been provided an improved trailer braking system, wherein an electric solenoid responsive to a signal from a source onboard a towing vehicle actuates a hydraulic master cylinder to operate a hydraulically-driven braking mechanism at the wheels of the trailer. Variations and modifications of the herein described braking system, in accordance with the invention, will undoubtedly suggest themselves to those skilled in this art. Accordingly, the foregoing description should be taken as illustrative and not in a limiting sense.

What is claimed is:

1. A braking system for a trailer, comprising:
    a) braking means for the wheels of said trailer including at least one hydraulically-actuable wheel cylinder for arresting the rotation of a rotatable element of said braking means;
    b) a hydraulic master cylinder containing hydraulic fluid and having a movable piston rod extending from an end thereof, said cylinder being connected in fluid-supplying relationship with said wheel cylinder;
    c) an electric solenoid disposed adjacent to and in fixed relationship to said master cylinder and having an armature movable axially within the windings of said solenoid in response to variations in axial magnetic field through said solenoid, the armature of said solenoid extending beyond the windings of said solenoid and being connected in mechanical driving relationship with said piston rod of said master cylinder; and
    d) means for providing a variable electric signal to said electric solenoid for varying the force exertable by said armature on said piston rod to vary the force exerted by said wheel cylinder on said rotatable element.

2. A braking system in accordance with claim 1 wherein said rotatable element is a brake drum and said braking means includes at least one movable brake shoe disposed between said wheel cylinder and a surface of said drum.

3. A braking system in accordance with claim 1 wherein said rotatable element is a brake disc and said braking means includes at least one movable brake pad disposed between said wheel cylinder and a surface of said brake disc.

4. A braking system in accordance with claim 1 wherein said solenoid armature and said piston are coaxially disposed and connected so that movement of said armature provides identical movement of said piston.

5. A braking system in accordance with claim 1 wherein said solenoid and said master cylinder are disposed in spaced-apart relationship, and wherein said system further comprises a pivotable linkage between said armature and said piston.

6. A braking system in accordance with claim 1 wherein said wheel braking means, said master cylinder, and said solenoid are disposable on a trailer and said means for providing a variable electric signal is disposable in a vehicle for towing said trailer.

7. A braking system in accordance with claim 1 wherein said means for providing a variable electric signal includes an electrical controller.

8. A braking system in accordance with claim 1 further comprising means for immobilizing said master cylinder piston to provide a hydromechanical parking brake.

9. A braking system in accordance with claim 1 further comprising a plurality of said wheel braking means, and wherein said master cylinder is provided with a plurality of individual chambers, each of said chambers being independently pressurizable, and each of said individual chambers being in unique hydraulic communication with one of said plurality of wheel braking means.

10. A braking system for a trailer, comprising:
   a) braking means for the wheels of said trailer including at least one hydraulically-actuable wheel cylinder for arresting the rotation of a rotatable element of said braking means;
   b) a hydraulic master cylinder containing hydraulic fluid and having a movable piston rod extending from an end thereof, said cylinder being connected in fluid-supplying relationship with said wheel cylinder;
   c) an electric solenoid disposed adjacent to and in fixed relationship to said master cylinder and having an armature movable axially within the windings of said solenoid in response to variations in axial magnetic field through said solenoid, the armature of said solenoid extending beyond the windings of said solenoid and being connected in driving relationship with said piston rod of said wheel cylinder, said solenoid including a plurality of independent windings; and
   d) means for providing a variable electric signal to said electric solenoid for varying the force exertable by said armature on said piston to vary the force exerted by said wheel cylinder on said rotatable element, each of said windings being independently suppliable with said variable electric signal.

11. A braking system for a trailer, comprising:
   a) braking means for the wheels of said trailer including at least one hydraulically-actuable wheel cylinder for arresting the rotation of a rotatable element of said braking means;
   b) a hydraulic master cylinder containing hydraulic fluid and having a movable piston rod extending from an end thereof, said cylinder being connected in fluid-supplying relationship with said wheel cylinder;
   c) an electric solenoid disposed adjacent to and in fixed relationship to said master cylinder and having an armature movable axially within the windings of said solenoid in response to variations in axial magnetic field through said solenoid, the armature of said solenoid extending beyond the windings of said solenoid and being connected in driving relationship with said piston rod of said wheel cylinder; and
   d) means for providing a variable electric signal to said electric solenoid for varying the force exertable by said armature on said piston to vary the force exerted by said wheel cylinder on said rotatable element, wherein said variable signal is selected from the group consisting of a time variation of the pulse frequency of direct current pulses, a time variation in current amplitude, and a time variation in voltage amplitude.

12. A braking system for a trailer, comprising:
   a) braking means for the wheels of said trailer including at least one hydraulically-actuable wheel cylinder for arresting the rotation of a rotatable element of said braking means;
   b) a hydraulic master cylinder containing hydraulic fluid and having a movable piston rod extending from an end thereof, said cylinder being connected in fluid-supplying relationship with said wheel cylinder;
   c) an electric solenoid disposed adjacent to and in fixed relationship to said master cylinder and having an armature movable axially within the windings of said solenoid in response to variations in axial magnetic field through said solenoid, the armature of said solenoid extending beyond the windings of said solenoid and being connected in driving relationship with said piston rod of said wheel cylinder; and
   d) a rheostat for providing a variable electric signal to said electric solenoid for varying the force exertable by said slug on said piston to vary the force exerted by said wheel cylinder on said rotatable element.

13. A method for braking the motion of a wheeled trailerable vehicle while rolling on its wheels, comprising the steps of:
   a) providing a hydraulically-actuable wheel braking means including at least one hydraulically-actuable wheel cylinder for arresting the rotation of a rotatable element attached to one of said wheels;
   b) providing a hydraulic master cylinder having a piston rod extending from an end thereof and connected in fluid-supplying relationship with said wheel cylinder;
   c) providing an electric solenoid disposed adjacent to said master cylinder, the armature of said solenoid being connected in mechanical driving relationship with said piston rod of said master cylinder;
   d) providing means for generating and sending a variable electric signal to said electric solenoid;
   e) sending said variable electric signal from said generating means to said solenoid;
   f) actuating said solenoid to extend said armature from an end thereof responsive to said electric signal;
   g) actuating said piston rod responsive to said actuation of said armature;
   h) actuating said wheel cylinder responsive to said actuation of said piston rod to exert arresting drag on said rotatable element.

* * * * *